United States Patent
Chang

(10) Patent No.: US 7,233,381 B2
(45) Date of Patent: Jun. 19, 2007

(54) OPTICALLY SELF-COMPENSATED BIREFRINGENCE LIQUID CRYSTAL DISPLAY COMPRISING SLITS FORMED IN THE PIXEL ELECTRODE

(75) Inventor: Ting-Jui Chang, Taipei (TW)

(73) Assignee: AU Optronics Corporation, Hsinchu (TW)

( * ) Notice: Subject to any disclaimer, the term of this patent is extended or adjusted under 35 U.S.C. 154(b) by 0 days.

(21) Appl. No.: 10/709,822

(22) Filed: Jun. 1, 2004

(65) Prior Publication Data

US 2005/0012886 A1    Jan. 20, 2005

(30) Foreign Application Priority Data

Jul. 14, 2003    (TW) ................. 92119110 A

(51) Int. Cl.
G02F 1/1343    (2006.01)
G02F 1/133    (2006.01)

(52) U.S. Cl. .................. 349/143; 349/142; 349/33

(58) Field of Classification Search ........ 349/141–143, 349/146
See application file for complete search history.

(56) References Cited

U.S. PATENT DOCUMENTS 6,466,293 B1 * 10/2002 Suzuki et al. ............... 349/144
6,812,986 B2 * 11/2004 Takatori et al. ............. 349/141
6,950,169 B2 * 9/2005 Ma et al. ..................... 349/146
2002/0105613 A1 * 8/2002 Yamakita et al. ........... 349/143
2002/0118331 A1 * 8/2002 Sakamoto et al. .......... 349/141
2003/0071952 A1 * 4/2003 Yoshida et al. ............. 349/141
2003/0086044 A1 * 5/2003 Inoue et al. ................. 349/141

* cited by examiner

Primary Examiner—Andrew Schechter
Assistant Examiner—W. Patty Chen
(74) Attorney, Agent, or Firm—Jianq Chyun IP Office

(57) ABSTRACT

A liquid crystal display is provided. An array structure of active device includes a substrate, a plurality of gate lines, a plurality of data lines, a plurality of active devices and a plurality of pixel electrodes thereon. Each of the pixel electrodes has several fine slits, and there is an angle included by the direction of electric field that crosses over the fine slit and the rubbing direction of liquid crystal layer. When applying voltage on the pixel electrodes, the liquid crystal molecules are to be twisted and transited from splay state into bend state rapidly. After that, the spreading elastic force between liquid crystal molecules could shorten the time of transition of the liquid crystal molecules in all pixel regions. Therefore, the optically self-compensated birefringence liquid crystal display can be warmed up faster.

20 Claims, 3 Drawing Sheets

OPTICALLY SELF-COMPENSATED BIREFRINGENCE LIQUID CRYSTAL DISPLAY COMPRISING SLITS FORMED IN THE PIXEL ELECTRODE

CROSS REFERENCE TO RELATED APPLICATIONS

This application claims the priority benefit of Taiwan application Ser. No. 92119110, filed Jul. 14, 2003.

BACKGROUND OF INVENTION

1. Field of Invention

The present invention relates to an array structure for an active device of optically self-compensated birefringence liquid crystal display. More particularly, the present invention relates to an array structure of an active device, capable of causing the liquid crystal layer in an optically self-compensated birefringence type to fast twist the LC molecules from the splay state and then be transited into the bend sate.

2. Description of Related Art

The multi-media sociality has been greatly developed. This is because of the great development on the semiconductor fabrication or the human-device displaying apparatus. With respect to the displaying device, the cathode ray tube (CRT) in recent years has constantly occupied most of the market due to its advantages of displaying quality and the economic consideration. However, for the environment that a person can operate multiple terminals/display-devices on a desk, or from the environment protection point of view, if the issue of power consumption is under consideration, it can be foreseen that the CRT has its issues without solution. The CRT cannot have the properties, such as being light, thin, short, small or low power consumption. Therefore, the thin film transistor liquid crystal display (TFT LCD), with the great properties of high image quality, improvement of space using efficiency, low power consumption, no irradiation, has gradually been the main stream in the market.

The liquid crystal display has been categorized into several types, according to the liquid crystal type, driving method, and light source implementation. Wherein, the OCB (Optically self-Compensated Birefringence) LCD has fast responding speed, and can provide the smooth images in change, when the computer displays the continuous images in prompt change for play the moving image or the movie. The OCB also stands for Optically Compensated Bend, and Optically Compensated Birefringence respectively. It is very suitable for application on the high level LCD. However, the OCB LCD has to let the liquid crystal molecules to be transited from the splay state to the bend state, and then it can enter the standby state for providing the function of fast responding speed.

FIG. 1A is a drawing, schematically illustrating the liquid crystal molecules for the OCB LCD. FIG. 1B is a drawing, schematically illustrating the OCB liquid crystal molecules at the bend state. In FIG. 1A and FIG. 1B, the OCB liquid crystal molecules 100 are disposed between an upper substrate 110 and a lower substrate 120. Wherein, the upper substrate 110 and the lower substrate 120 respectively have alignment layers with an alignment direction in parallel. When the OCB liquid crystal molecules 100 are not applied with the external electric field, the liquid crystal molecules are aligned in a splay state. When the OCB LCD intends to enter the standby state, it is necessary to apply an electric field, perpendicular to the upper substrate 110, onto the OCB liquid crystal molecules 100, so as to gradually transit to the bend state. For the conventional OCB LCD, it needs a few minutes to perform this transition, in order to be properly driven. This means that it needs a certain time for warm up before entering the standby state. This is very harmful for the LCD, which should have the function to be ready while being turned on. Therefore, it is necessary to have the fast transition for the OCB LCD, so as to be easily accepted by the user.

In the conventional skill, one way to achieve the fast transition is done by a specific driving method. Another way is that a specific pixel design is taken, so as to cause a portion of the liquid crystal molecules to be in a specific alignment, and thereby accelerate the transition duration from the splay state to the bend state.

SUMMARY OF INVENTION

The invention provides an LCD, such as an OCB LCD, wherein the time for transiting the liquid crystal molecules from the splay state to the bend state can be reduced.

The invention provides an array structure for the active device, capable of causing the liquid crystal layer, in for example an optically self-compensated birefringence type, to fast produce a twist alignment from the splay state and then to be transited into the bend sate. The array structure for the active device includes a substrate, a plurality of gate lines formed on the substrate, a plurality of data lines, a plurality of active devices, and a plurality of pixel electrodes. Wherein, a region between any two adjacent gate lines and any two adjacent data lines forms a pixel region. The active device is implemented on the crossing area of the gate lines and the data lines. In addition, the active devices are electrically coupled to the corresponding gate line and the data line, respectively. The pixel electrodes are implemented above the pixel regions, and respectively coupled to active device in electric coupling, wherein each of the pixels has several fine slits. Also and, an included angle is formed between the direction of the electric field crossing over the fine slits and a alignment direction on the liquid crystal layer. The width of the fine slit is less than the thickness of the OCB liquid crystal layer.

For at least the foregoing objectives, the invention provides a LCD, such as an OCB LCD. The LCD includes an array structure of active device of the invention as described above, an opposite substrate, two alignment films, and a liquid crystal layer. The opposite substrate, for example, includes a color filter and a common electrode disposed thereon. The alignment films are implemented over the array structure of active device and the opposite substrate. The liquid crystal layer is implemented between the two alignment films, and the liquid crystal molecules are aligned in parallel due to the alignment films.

By the design of fine slit, when a voltage is applied on the pixel electrode for operation, molecules of the liquid crystal layer are affected by the electric field, and are twisted within the fine slit region, so that it can be fast transited from the splay state to the bend state. Within the local region, the liquid crystal molecules in alignment have been fast transited. Then, due to the propagation of the elastic force between the OCB liquid crystal molecules, the time for transiting the whole pixels can be reduced, and the purpose to have fast warm up for the LCD can be achieved.

It is to be understood that both the foregoing general description and the following detailed description are exem plary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1A:
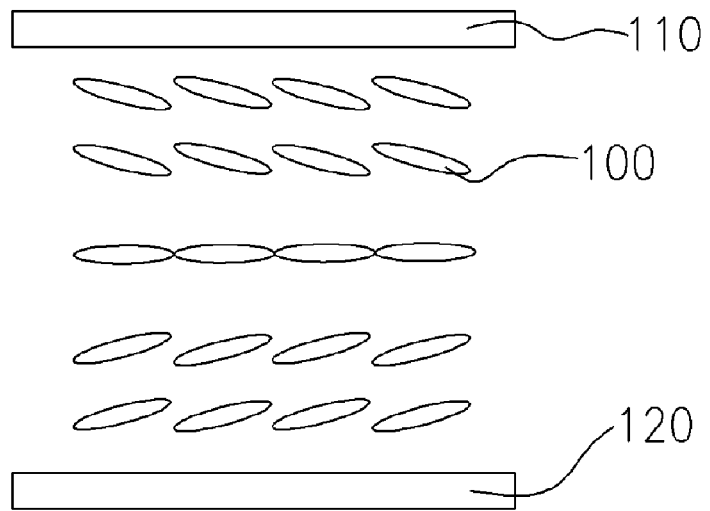
FIG. 1A is a drawing, schematically illustrating the liquid crystal molecules for the OCB LCD.
Figure 1B:
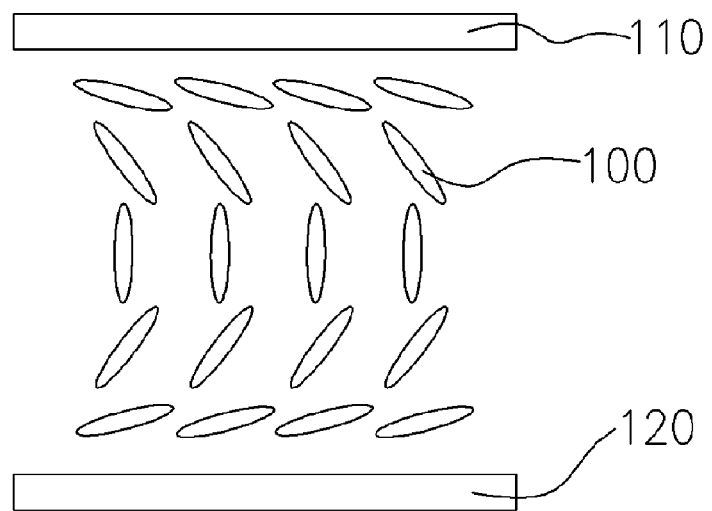
FIG. 1B is a drawing, schematically illustrating the OCB liquid crystal molecules at the bend state.
Figure 2:
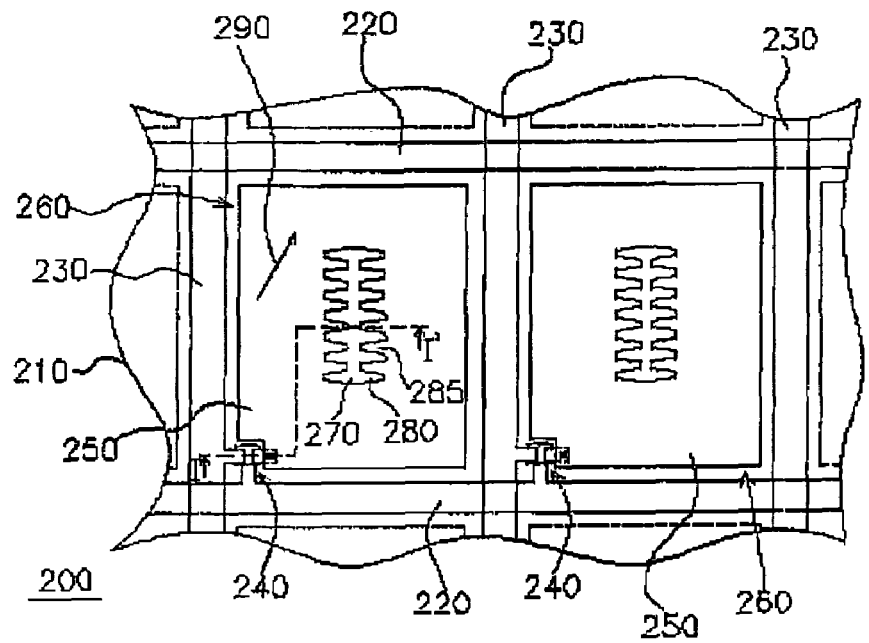
FIG. 2 is a drawing, schematically illustrating the array structure of the active device, according to a preferred embodiment of the invention.

FIG. 2 is a drawing, schematically illustrating the array structure of the active device, according to a preferred embodiment of the invention. In FIG. 2, the array structure 200 of active devices includes a substrate 210, several lines 220, that are, scan lines disposed on the substrate 210, several data lines 230, several active devices 240, and several pixel electrodes 250. Wherein, the gate lines 220 are parallel to each other and disposed over the substrate 210. The data lines 230 are also parallel to each other and disposed over the substrate 210 but the gate lines 220 are perpendicular to the data lines 230. A region between any two adjacent gate lines 220 and any two adjacent data lines 230 forms a pixel region 260. The active devices 240 include, for example, thin film transistors, disposed at the intersecting region of the gate lines 220 and the data lines 230. Also and, the active devices 240 are electrically coupled to the corresponding gate lines 220 and the data lines 230, respectively. The pixel electrode 250 includes, for example, the transparent electrode or the reflection electrode, disposed over the pixel region 260, and electrically coupled to the corresponding active device 240.

Referring to FIG. 2, wherein each of the pixel electrodes 250 has a main slit 270. Two sides of the main slit 270 have several protruding fine slits 280. As a result, each pixel electrode 250 has several tooth-like jags 285. In addition, an included angle is formed between the direction of electric filed crossing over the fine slits 280 and the alignment direction 290 of the OCB liquid crystal layer. The width of the fine slits 280 is preferably less than the thickness of the OCB liquid crystal layer.

Figure 3:
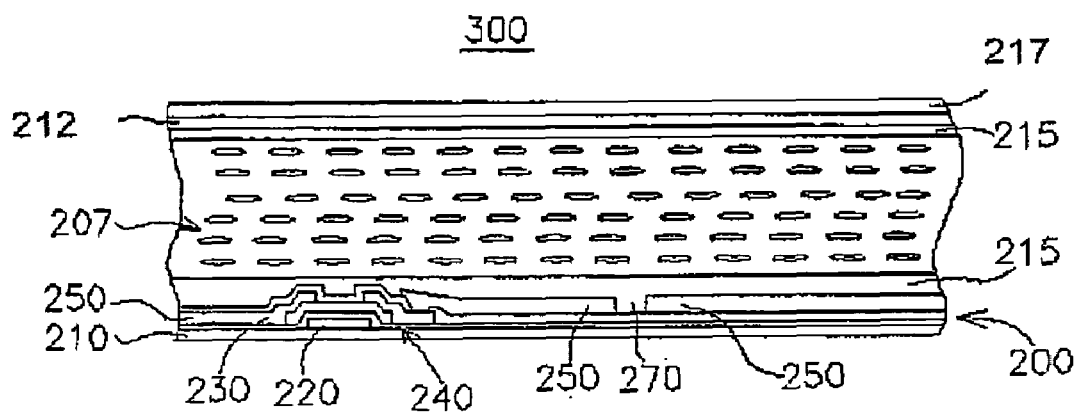
FIG. 3 is a cross-sectional view along the I–I" line in FIG. 2, schematically illustrating the OCB LCD, according to a preferred embodiment of the invention.

FIG. 3 is a cross-sectional view along the I–I" line in FIG. 2, schematically illustrating the OCB LCD, according to a preferred embodiment of the invention. In FIG. 2 and FIG. 3, the OCB LCD 300 includes an array structure 200 of active device of the invention as described above, an opposite substrate 217, two alignment films 215, and an OCB liquid crystal layer 207. The opposite substrate 217, for example, includes a color filter and a common electrode 212 disposed thereon. The alignment films 215 are implemented over the array structure 200 of the active device and the opposite substrate 217. The OCB liquid crystal layer 207 is implemented between the two alignment films 215. The parallel alignment is obtained due to the alignment films 215.

Figure 4:
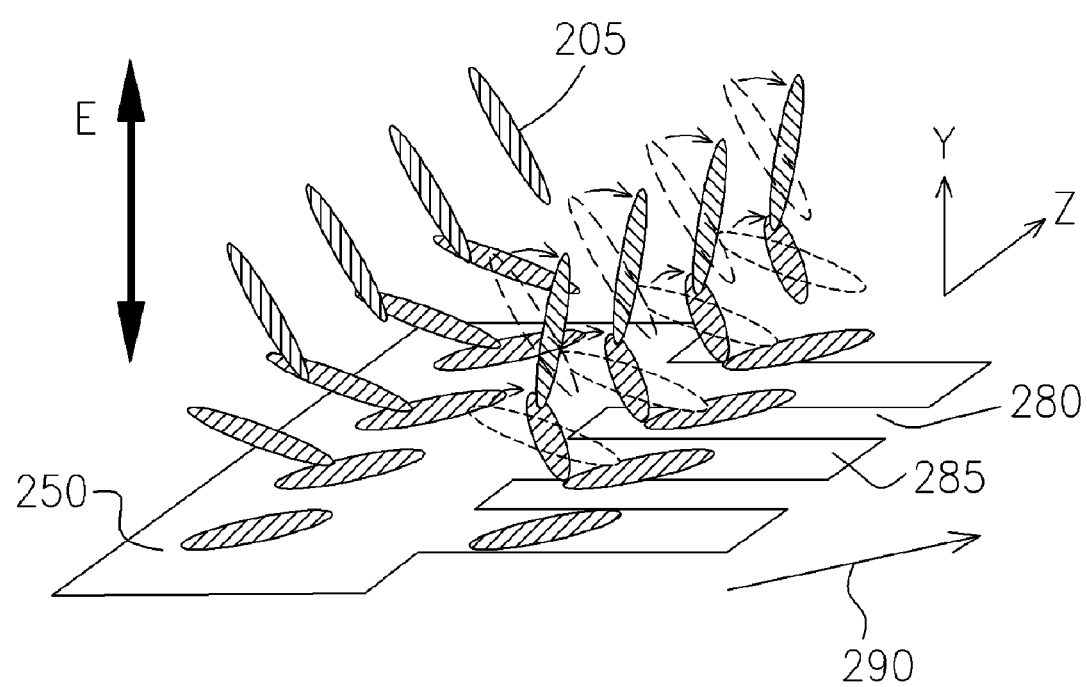
FIG. 4 is a drawing, schematically illustrating the operation mechanism of the OCB liquid crystal molecules within the fine slit region, according to a preferred embodiment of the invention.

FIG. 4 is a drawing, schematically illustrating the operation mechanism of the OCB liquid crystal molecules within the fine slit region. In FIG. 4, the OCB liquid crystal molecules 205 at the initial state are aligned along the alignment direction 290 as the splay state. When a voltage is applied on the pixel electrode 250, the OCB liquid crystal molecules 205 within the normal region are tilted by the electric field E in the direction of the Y axis, which is perpendicular to the initial aligning direction. As a result, the tilt angle of the molecules is gradually raised, and an asymmetric splay state is gradually formed. Since the liquid crystal elastic energy is in discontinuous change while the OCB liquid crystal molecules 205 are transited from the splay state to the bend state, it needs longer time under the electric field to have the complete transition.

On the other hand, within the region of fine slit 280, the electric field in this region is changed due to the specific structure. This causes the OCB liquid crystal molecules 205 to be additionally affected by the electric field along the Z axis. Moreover, the rubbing direction 290 on the OCB liquid crystal molecules 205 is specifically chosen to have an included angle with the electric filed along the Z axis. In this manner, the OCB liquid crystal molecules 205 can also be rotated and twisted along the Y axis. Since the OCB liquid crystal molecules 205 are transited from the splay state to the twisted state, and then is transited from the twisted state to the bend state, the change of the elastic energy is continuous. As a result, within this region, the transition process can be fast achieved, and the region is fast transited to the bend state. Therefore, this region can serve as the initial point for transiting the whole pixel. The elastic force can be propagated outward and extend over the whole pixel, so as to achieve the objective of fast transition.

It should be noted that pixel electrode in the array structure of the active device is not necessary to have the main slit but only has several fine slits, according to the preferred embodiment of the invention. In this manner, the transition process for the OCB liquid crystal molecules from the splay state to the bend state still can be fast achieved.

In conclusions, it at least has several advantages for the OCB LCD in the invention as follows:

1. Due to the effect from the fine slits formed on the pixel electrode, it can trigger the OCB liquid crystal molecules within the whole pixel region to fast transit from the splay state to the bend state. In comparing with the convention OCB LCD, the tine for warming up is effectively reduced in the invention.

2. In the invention, the fabrication process for the OCB LCD is compatible with the current fabrication process, the fabrication process of the invention does not cause a load on the fabrication cost therefore.

It should be noted that the OCB liquid crystal is used as the example for descriptions. However, the usual liquid crystal without OCB property can still be applied with the invention. The invention, in general, is to accelerate the liquid crystal layer from a splay state to a bend state.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

The invention claimed is:

1. An array structure of active device capable of accelerating an OCB (optically self-compensated birefringence) liquid crystal layer from a splay state to a bend state, the array structure comprising:
   a substrate;
   a plurality of gate lines disposed over the substrate;
   a plurality of data lines disposed over the substrate, wherein a pixel region is formed between any two adjacent gate lines and any two adjacent data lines;
   a plurality of active devices disposed over the substrate, the active devices being respectively formed in an intersection region between the gate lines and the data lines, and respectively electrically coupled to the corresponding gate lines and the data lines; and
   a plurality of pixel electrodes disposed over the pixel regions and respectively electrically coupled to the corresponding active devices, each of the pixel electrodes having a main slit, a plurality of first fine slits extending from one side of the main slit, and a plurality of second fine slits extending from another side of the main slit, wherein the first fine slits and the second fine slits taper off toward an outer edge of the corresponding pixel electrode.

2. The array structure of claim 1, wherein the first fine slits taper off toward one of the adjacent data lines and the second fine slits taper off toward another of the adjacent data lines.

3. The array structure of claim 2, wherein the gate lines are in parallel and disposed over the substrate, the data lines are in parallel and disposed over the substrate, and the gate lines are perpendicular to the data lines.

4. The array structure of claim 2, wherein the active devices comprise thin film transistors.

5. The array structure of claim 2, wherein the pixel electrodes comprise transparent pixel electrodes.

6. The array structure of claim 2, wherein the pixel electrodes comprise reflection electrodes.

7. The array structure of claim 2, wherein a width of the first fine slits and the second fine slits is less than a thickness of the liquid crystal layer.

8. An liquid crystal display (LCD), comprising:
   an array structure as recited in claim 1;
   an opposite substrate having a common electrode thereon;
   two alignment films disposed over the array structure and the opposite substrate; and
   a liquid crystal layer held between the alignment films and formed by the alignment films in parallel direction, the liquid crystal layer possessing a transition from a splay state to a bend state while operating.

9. The LCD of claim 8, wherein the gate lines are disposed over the substrate in parallel, the data lines are disposed over the substrate in parallel, and the gate lines are perpendicular to the data lines.

10. The LCD of claim 8, wherein the active devices comprise thin film transistors.

11. The LCD of claim 8, wherein the pixel electrodes comprise transparent pixel electrodes.

12. The LCD of claim 8, wherein the pixel electrodes comprise reflection electrodes.

13. The LCD of claim 8, wherein a width of the first fine slits and the second fine slits is less than a thickness of the liquid crystal layer.

14. The LCD of claim 8, wherein the opposite substrate comprises a color filter.

15. An array structure of active device capable of accelerating an OCB (optically self-compensated birefringence) liquid crystal layer from a splay state to a bend state, the array structure comprising:
   a substrate;
   a plurality of gate lines disposed over the substrate;
   a plurality of data lines disposed over the substrate, wherein a pixel region is formed between any two adjacent gate lines and any two adjacent data lines;
   a plurality of active devices disposed over the substrate, the active devices being respectively formed in an intersection region between the gate lines and the data lines, and respectively electrically coupled to the corresponding gate lines and the data lines; and
   a plurality of pixel electrodes disposed over the pixel regions and respectively electrically coupled to the corresponding active devices, each of the pixel electrodes having a main slit, a plurality of first fine slits extending from one side of the main slit, and a plurality of second fine slits extending from another side of the main slit, the first fine slits and the second fine slits tapering off toward an outer edge of the corresponding pixel electrode, and an electric field direction crossing over the first fine slits and the second fine slits being at a predetermined angle to an alignment direction of the OCB liquid crystal layer, wherein when a voltage is applied to the pixel electrodes, a direction of a portion of liquid crystal molecules within a normal region are tilted by the electric field in a direction, which is perpendicular to an initial aligning direction.

16. The array structure of claim 15, wherein the first fine slits taper off toward one of the adjacent data lines and the second fine slits taper off toward another of the adjacent data lines.

17. The array structure of claim 16, wherein the gate lines are in parallel and disposed over the substrate, the data lines are in parallel and disposed over the substrate, and the gate lines are perpendicular to the data lines.

18. An OCB (optically self-compensated birefringence) LCD (liquid crystal display) panel comprising:
   a first and a second substrate opposed to each other;
   an array of pixel electrodes overlying the first substrate that faces the second substrate, wherein each pixel electrode defines a pixel region and is electrically connected to an active device, each of the pixel electrodes has a main slit, a plurality of first fine slits extending from one side of the main slit and a plurality of second fine slits extending from another side of the main slit, and the first fine slits and the second fine slits taper off toward an outer edge of the corresponding pixel electrode;
   a first and a second alignment film overlying the first substrate having the pixel electrodes thereon and the second substrate that faces the first substrate; and
   an OCB liquid crystal layer between the two alignment films.

19. The OCB LCD panel of claim 18, wherein within a region of the fine slits, liquid crystal molecules are transited from a splay state to a twisted state and then to a bend state.

20. The OCB LCD panel of claim 18, wherein the first fine slits taper off toward one of the adjacent data lines and the second fine slits taper off toward another of the adjacent data lines.

* * * * *